J. & J.C. Holyland,
Cracker Machine.
Nº 21,606.          Patented Sep. 28, 1858.
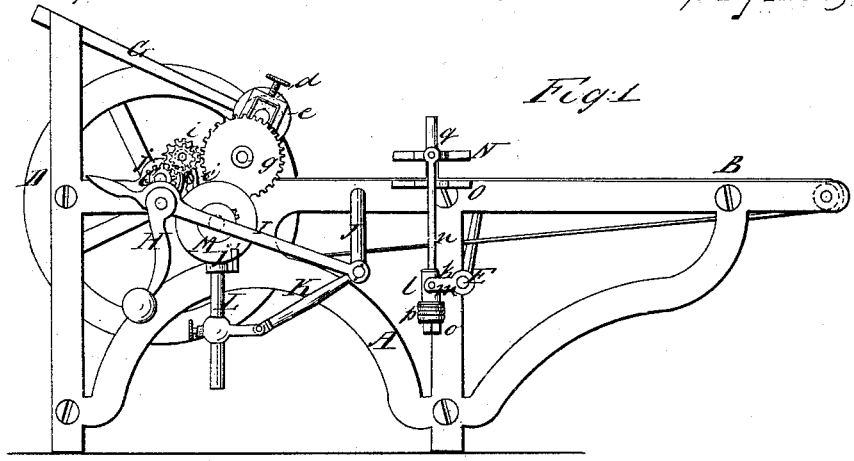
Fig. 1
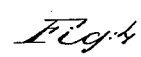
Fig. 4
Fig. 3
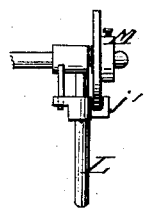
Fig. 2
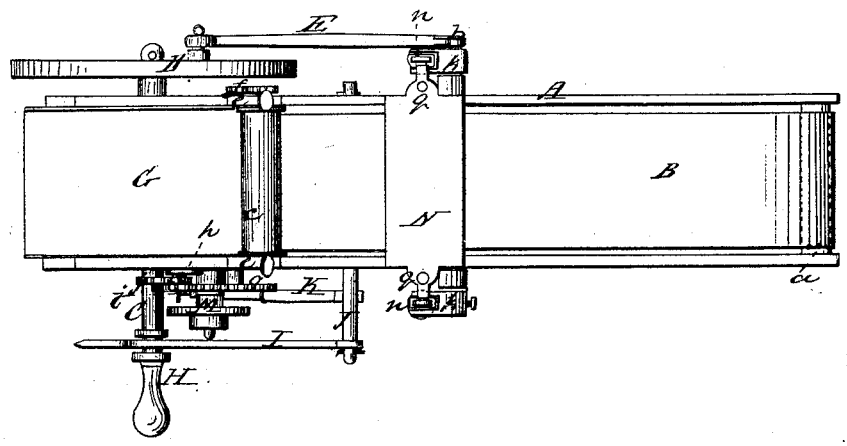

UNITED STATES PATENT OFFICE.

J. HOLYLAND AND J. C. HOLYLAND, OF ROCHESTER, NEW YORK.

CRACKER-MACHINE.

Specification of Letters Patent No. 21,606, dated September 28, 1858.

*To all whom it may concern:*

Be it known that we, J. HOLYLAND and J. C. HOLYLAND, of Rochester, in the county of Monroe and State of New York, have invented a new and useful Improvement in Cracker-Machines; and we do hereby declare that the following is a full, clear, and exact description of the same, reference being had to the annexed drawings, making a part of this specification, in which—

Figure 1, is a side view of a cracker machine, with our improvement applied to it. Fig. 2, is a plan or top view of ditto. Fig. 3, is a detached view of the friction gear. Fig. 4, is a detached vertical section of the spring attachment which is applied to the rods of cutter plate.

Similar letters of reference indicate corresponding parts in the several figures.

This invention relates to an improvement in machines that are used for cutting out crackers from sheets of dough and which are generally known as cracker machines.

The invention consists in applying springs to rods which are connected with the cutter plate as hereinafter shown and described, so that the machine will be protected from all strain and the cutter plate made to act more efficiently than usual.

To enable those skilled in the art to fully understand and construct our invention we will proceed to describe it.

A, represents the frame of the machine which may be constructed in the usual or any proper form, and B, is an endless apron which works over rollers $a$, $a$, placed in the upper part of the frame.

C, is a driving or power shaft placed transversely in the frame and parallel with the apron rollers $a$, $a$. This shaft C, has a fly wheel D, at one end to which one end of a rod E, is attached, the opposite end of said rod being connected to an arm $b$, of a rock shaft F, which is placed in the frame A, below the apron B.

G, is an inclined board which is placed on the upper part of the frame A, and has its lower end directly opposite the "bite" of the rollers $c$, $c$, which have their journals fitted in proper bearings $d$, in boxes $e$, on the upper part of the frame just above the apron. The rollers are placed one above the other in an inclined plane which is nearly at right angles to the chute or board G. The rollers $c$, $c$, are connected at one end by gears $f$, and the lowermost roller at its opposite end is provided with a toothed wheel $g$, which is connected by intermediate wheels $h$, $i$, with a pinion $j$, on the driving or power shaft C, the wheels $h$, $i$, being attached to a curved slide $i'$, and so arranged as to permit the wheel $i$ to be changed and varying sizes applied to regulate the feed of the dough to the apron B.

To the end of the driving or power shaft C, opposite to that end where the fly wheel D, is attached there is placed a crank H, to which one end of a connected rod I, is attached, the opposite end being connected to an arm J, which is connected by a rod K, with the lever L, of a friction pawl or clutch $j'$, which acts on a wheel M, at one end of the inner apron roller $a$.

To each end of the rock shaft E, there is attached an arm $k$, and these arms are connected at their outer ends to sockets $l$, by pins $m$. Through each socket $l$, a vertical rod $n$, passes, said rods having the portion of them that works in said sockets of rectangular form corresponding with the interior of the sockets, the pin $m$, passing through oblong slots $m'$, in the sockets, see Fig. 4. A nut $o$, is fitted on the lower end of each rod $n$, and springs $p$, of india rubber or other suitable elastic material are interposed between the nuts $o$, and the lower ends of the sockets $l$. The upper ends of the rods $n$, $n$, are attached to a plate N, which works vertically on guides $q$, $q$, above the apron B. This plate has the usual cutters attached, the cutters are not shown in the drawings. On the frame A, and directly underneath the cutter plate N, a bed plate O, is placed, the apron B, passing over said plates, see Fig. 1.

The operation is as follows—The dough is placed on the inclined board G, and motion is given the shaft C, by any proper means. The rollers $c$, feed the dough on the apron B, and compress it in the form of a sheet. The apron B, is moved intermittently by the friction gear formed of the wheel M, and pawl or clutch $f'$, attached to rod L. The cutter plate N, is raised by the rod E, arm $b$, and crank wheel D, while the apron is being moved and during the dwells of the apron the cutter plate descends and the cutters cut the dough directly over the bed O. The springs $p$, it will be seen allow a limited independent movement of the arms K, and consequently prevents all strain and the operation of the cutters of plate N, are rendered more perfect or effectual than usual as the cutters are allowed a slight dwell on the apron at the termination of the downward stroke of plate N.

The machine can be worked or operated with a greater speed than the old machines as the movement of the cutter plate is not as in them entirely arbitrary.

We do not claim the endless apron, reciprocating cutter plate, nor feed collars c,—neither do we claim the friction gear for operating the apron B, but, having thus described our invention,

What we claim as new and desire to secure by Letters Patent, is—

The arrangement and combination of the socket (l), arm (R), spring (p), and rod (n), as and for the purposes herein shown and described.

J. HOLYLAND.
J. C. HOLYLAND.

Witnesses:
F. De Lano,
H. B. Ensworth.